United States Patent
Gong et al.

(10) Patent No.: US 7,653,076 B2
(45) Date of Patent: Jan. 26, 2010

(54) METHOD AND APPARATUS FOR GATEWAY CONTROL PROTOCOL MESSAGE TRANSMISSION

(75) Inventors: Bitao Gong, Shenzhen (CN); Zhenhua Liu, Shenzhen (CN); Xian Zhou, Shenzhen (CN); Yu Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 11/856,152

(22) Filed: Sep. 17, 2007

(65) Prior Publication Data

US 2008/0049784 A1 Feb. 28, 2008

Related U.S. Application Data

(63) Continuation of application No. PCT/CN2006/000780, filed on Apr. 24, 2006.

(30) Foreign Application Priority Data

Apr. 22, 2005 (CN) .......................... 200510034409

(51) Int. Cl.
*H04L 12/56* (2006.01)
*H04J 1/16* (2006.01)

(52) U.S. Cl. .................... 370/401; 370/352; 370/466

(58) Field of Classification Search ......... 370/352–356, 370/400, 401, 466, 467
See application file for complete search history.

(56) References Cited

U.S. PATENT DOCUMENTS

| 2003/0214971 A1 | 11/2003 | Sheldon et al. |
| 2006/0133352 A1* | 6/2006 | Chang .................. 370/352 |
| 2008/0002669 A1* | 1/2008 | O'Brien et al. ......... 370/352 |

FOREIGN PATENT DOCUMENTS

| CN | 1364377 | 8/2002 |
| EP | 1286517 | 2/2003 |

* cited by examiner

*Primary Examiner*—John Pezzlo
(74) *Attorney, Agent, or Firm*—Finnegan, Henderson, Farabow, Garrett & Dunner LLP

(57) ABSTRACT

A method of interface communication between entities in soft switch system in NGN, and a method and apparatus for Gateway Control Protocol (GCP) message transmission are disclosed, so that H.248 messages can be transmitted between Media Gateway Controller and Media Gateway over MTP3B/ATM, hence full advantages of resources are taken in existing optical fiber networks and E1/T1 networks, so as to improve the networking flexibility and reduce the cost. The internal data transmission mechanism between MTP3B protocol layer and H.248 protocol layer is established via an M3H adaptation layer; load sharing between H.248 processing modules is enabled by establishing mapping between H.248 links and MTP3B signaling points; the adaptation relationship between MTP3B layer and H.248 layer is implemented by configuring and maintaining logic relationship between table of LinkSets, H.248-MTP3B mapping table, and table of H.248 processing modules, thus implementing the mechanism of bearing H.248 messages over MTP3B.

16 Claims, 3 Drawing Sheets

METHOD AND APPARATUS FOR GATEWAY CONTROL PROTOCOL MESSAGE TRANSMISSION

FIELD OF THE INVENTION

The present invention relates to the method for interface communication between entities in soft switch systems of next generation network (NGN), and more particularly, the present invention relates to a method and an apparatus for transmitting gateway control protocol (GCP) messages between media gateway controller (MGC) and media gateway (MGW).

BACKGROUND OF THE INVENTION

As the time evolves to the 21st century, the network economy driven by Internet has been submerged in excessive bubbles, under which the Internet falters and is facing a variety of challenges ahead, including the compromise between cost and demand, Quality of Service and technical difficulties, transition to the next generation Internet Protocol Version 6 (IPv6), seeking for new value chains and profitability models, and challenges in network, information security, etc. Next Generation Networks (NGN) require support from many new techniques, in which the foreseeable techniques include IPv6 technique, high speed optical fiber transmission technique, optical switching and intelligent optical network technique, broadband access technique, metropolitan area network (MAN) technique, soft switch technique, the third generation (3G) and post 3G mobile communication techniques, network security technique, etc. Among these techniques, the soft switch technique is one of the key techniques supporting NGN.

Soft switch technique is designed to completely separate control function (including service control function and network resource control function) from transmission function. NGN is required to utilize the soft switch technique. The concept of soft switch is based on the new layered model of network functions including access and transport layer, media layer, control layer, and network service layer, and is employed to integrate/separate the functions in different degrees and enable the service providers to combine service transmission and control protocols flexibly through a variety of interface protocols, so as to implement service integration and transition. Therefore, the soft switch technique is very suitable for coexistence and intercommunication of different networks and is also applicable to evolution from voice-based network to multi-service multimedia network. The interface protocol H.248/MEGACO between Media Gateway Controller (MGC) and Media Gateway (MGW) approved jointly by International Telecommunication Union (ITU) and Internet Engineering Task Force (IETF) is a key protocol and reflects the great efforts for promotion of NGN in the telecommunication field and the Internet field.

Soft switch technique requires to separate call control function from MGW, i.e., from the transport layer, and to implement with software the connection control, translation and route selection, gateway management, call control, bandwidth management, signaling, security, call detail record generation, etc. This separates control from service provision. Soft switch in a packet switched network provides the same function as circuit switched network. Accordingly, a soft switch is also referred to as a call proxy or a call server. Soft switch technique is service-independent and is a technique that provides telecommunication services over Internet Protocol (IP) networks. In a circuit switched network, call control, service provision, and switching matrix are integrated in one system. In contrast, the essence of soft switch lies in the separation of service and control from transmission and access, so that the entities may connect with each other and communicate with each other using standard protocols, so as to provide services in a more flexible manner. In other words, a soft switch is a software-based distributed switching/control platform, which separates call control function from the media gateway, thereby facilitates the introduction of a variety of services into the network.

The soft switch is a function entity that provides call control and connection control functions for services with real-time requirement in NGN, and is the core for call and control in NGN. As an open entity, the soft switch has to employ open protocols for the external interfaces. The interface between MGW and soft switch is designed to support the soft switch to perform bearer control, resource control and management for the MGW, and this interface is the H.248 or MEGACO protocol. The interface between signaling gateway and soft switch is designed to transmit messages between the soft switch and the signaling gateway, and can employ the Signaling Control Transfer Protocol (SCTP) or other similar protocols. The interface between soft switches is designed to enable the interaction between the soft switches and can employ the Session Initial Protocol (SIP). The interface between soft switch and application/service layer is designed to provide access to a variety of databases, third-party application platforms, and function servers, so as to enable the support for various value added services, administrative services, and third-party applications.

After the separation of control and bearing, the H.248 protocol is used for transmission between MGC and MGW, so as to enable the control for MGW by MGC. In the MGW, there are generally multiple H.248 protocol processing modules, so as to meet the requirement for high traffic throughput. MGC can choose different links to transmit H.248 messages, so as to distribute the load between the individual H.248 processing modules. Different distribution modes have to be implemented in different mechanisms, such as primary/standby mode or load sharing mode. In the primary/standby mode, MGW chooses a primary link to transmit H.248 signaling messages, and chooses a standby link for transmission only when the primary link fails. In the load sharing mode, MGW chooses multiple links to share the load and transmit the H.248 signaling messages.

The major configuration information of an H.248 link includes: link number LinkNo which identifies the H.248 signaling link configured by the user; H.248 module identification ModuleID which identifies the module that processes the H.248 messages; local IP address LocalIPAddr which is the IP address configured for the local H.248 protocol processing module; local port number LocalPort which is the port number configured in the local H.248 protocol processing module; remote IP address RemoteIPAddr which is the IP address configured for the remote H.248 protocol processing module; and remote port number RemotePort which is the port number configured in the remote H.248 protocol processing module.

Message Transfer Part at level 3 Broadband (MTP3B) is a message transport protocol based on Asynchronous Transfer Mode (ATM), and is adapted to transmit messages between signaling points in the signaling network. MTP3B employs Signaling Point Codes (SPCs) to identify the nodes in the signaling network, and transmits messages through the MTP3B links established between these nodes. Multiple MTP3B links can be established between a pair of signaling points, and each link is identified with a unique Signaling Link Code (SLC). MTP3B chooses an appropriate signaling route and link having the highest priority level currently in the route list configured in the present signaling point in accordance with the routing information contained in the Route Label in the signaling message, so as to send the user's message to the specified destination signaling point properly via the signaling route and link. The routing information in the Route Label mainly includes:

Network Identification (NI), which identifies the network type of the signaling point; the value of NI can be "International", "International Standby", "Domestic", "Domestic Standby", etc.

Original Point Code (OPC), which indicates the code value of the original signaling point, and may uniquely identify, together with NI, a signaling point that is the starting point for message transmission. The value range of OPC depends on the type of the signaling point code: if the type of the signaling point code is of 14-bit type, the value of OPC is 0~0x3fff; if the type of the signaling point code is of 24-bit type, the value is 0~0xffffff;

Destination Point Code (DPC), which indicates the code value of the destination signaling point, and can uniquely identify, together with NI, a destination signaling point that is the destination for message transmission; DPC has the same value range as OPC; Signaling Link Selection (SLS), in 4 bits, which is used by MTP3B to enable load sharing between multiple MTP3B links.

MTP3B can transmit a variety of messages, such as H.248 messages and Radio Access Network Application Part (RANAP) messages. The message transmission in MTP3B has many advantages over other message transmission methods (e.g., message transmission over IP link). For example, the MTP3B transport layer is ATM layer, while the ATM transmission technique incorporates advantages of both of circuit switched and packet switched, so ATM can not only provide reliable QoS guarantee but also support service transmission at diverse data rates, thereby can meet the requirement for the development of broadband. In addition, by utilizing the ATM transmission technique, it is enabled to take full advantage of the existing E1/T1 resources, provide more flexible networking modes and reduce the cost of network transmission.

In many existing networks, message transmission between MGC and MGW is generally via IP links. A typical networking mode in 3G is shown in FIG. 1 which shows the networking between the access systems (including 3G mobile station, base station, Radio Network Controller (RNC)) and MGW and MGC. The RNC is connected to MGW over ATM. The transmission of H.248 messages between MGC and MGW is based on IP. The protocol stack for transmission is H.248/SCTP/IP. In MGW, multiple H.248 protocol processing modules are used to meet the requirement for high traffic throughput. Each of those modules provides an Ethernet interface to connect with MGC. Through the H.248 links configured between those modules, H.248 messages can be transmitted over IP between MGC and MGW.

In the practical applications of the above described solution, only Ethernet resources can be used during the transmission of H.248 messages between MGW and MGC over IP. This results in a limited networking flexibility. The operator will have to update many legacy network resources, which brings about a high cost in network construction.

This problem is resulted from the fact that the transmission of H.248 messages between existing MGC and MGW is via IP links, which can not take the advantages of ATM network resources and networking.

SUMMARY OF THE INVENTION

The present invention is to provide a method and an apparatus for Gateway Control Protocol (GCP) message transmission, so that the H.248 messages may be transmitted between Media Gateway Controller (MGC) and Media Gateway (MGW) over MTP3B/ATM, so as to take full advantage of the resources in the existing optical fiber networks and E1/T1 networks, thereby improving the networking flexibility and reducing the cost.

The present invention provides a method for Gateway Control Protocol message transmission between a Media Gateway Controller (MGC) and a Media Gateway (MGW), the method includes:

when an MTP3B protocol layer receives a Gateway Control Protocol message, obtaining, by an adaptation layer M3H pre-configured between Message Transfer Part at level 3 Broadband (MTP3B) and Gateway Control Protocol, MTP3B information provided by the MTP3B protocol layer, determining a corresponding Gateway Control Protocol processing module in accordance with a pre-established mapping between the MTP3B protocol layer and a Gateway Control Protocol protocol layer, and forwarding the Gateway Control Protocol message to the Gateway Control Protocol processing module.

In another aspect of the present invention, there is provided a method for Gateway Control Protocol message transmission between an MGC and an MGW, the method includes:

when a Gateway Control Protocol processing module sends a Gateway Control Protocol message, obtaining, by an adaptation layer M3H pre-configured between Message Transfer Part at level 3 Broadband (MTP3B) and Gateway Control Protocol, information of the Gateway Control Protocol message, acquiring the corresponding MTP3B information in accordance with a pre-established mapping between an MTP3B protocol layer and a Gateway Control Protocol protocol layer, and forwarding the Gateway Control Protocol message to the MTP3B protocol layer which in turn sends out the Gateway Control Protocol message.

The present invention also provides an apparatus for GCP message transmission between MGC and MGW, the apparatus includes: an adaptation layer M3H between a Message Transfer Part at level 3 Broadband (MTP3B) protocol layer and a Gateway Control Protocol layer, the adaptation layer M3H has a mapping between the MTP3B protocol layer and the Gateway Control Protocol layer; the adaptation layer M3H is adapted to, when the adaptation layer M3H receives a Gateway Control Protocol message, obtain MTP3B information provided by the MTP3B protocol layer, determine a corresponding Gateway Control Protocol processing module in accordance with the mapping, and forward the Gateway Control Protocol message to the Gateway Control Protocol processing module for processing; and when the Gateway Control Protocol processing module sends a Gateway Control Protocol message, the adaptation layer M3H obtains information of the Gateway Control Protocol message, acquires corresponding MTP3B information in accordance with the mapping, and forwards the Gateway Control Protocol message to the MTP3B protocol layer, then the MTP3B protocol layer sends the Gateway Control Protocol message.

As can be seen that an adaptation layer function entity M3H is employed in the embodiments of the present invention to establish the data transmission mechanism between the MTP3B protocol layer and the H.248 protocol layer in the device;

In a preferred embodiment, load is shared between H.248 processing modules by establishing the mapping between H.248 link numbers and MTP3B NIs, SPCs, and DPCs. The adaptation relationship between the MTP3B layer and the H.248 layer is implemented by configuring and maintaining the logic relationship between a table of LinkSets, an H.248-MTP3B mapping table, and a table of H.248 processing modules, thus implementing the mechanism of bearing H.248 messages over MTP3B.

This brings about some beneficial effects, that is, the networking may be more flexible, the existing network resources may be utilized fully, and the networking cost may be reduced, by bearing H.248 messages over MTP3B and employing a matured technique (e.g., ATM) for the transport layer and employing E1/T1 network resources for the physical layer.

DETAILED DESCRIPTION OF THE EMBODIMENTS

Figure 1:
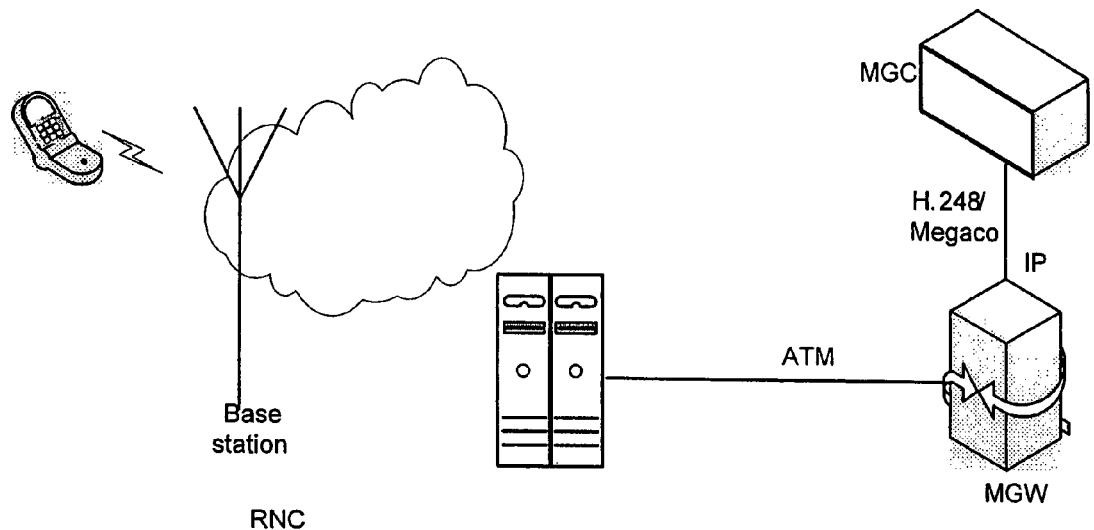
FIG. 1 is a schematic diagram of networking between MGC and MGW in the related art.

The embodiments of the present invention will be described in detail below with reference to the accompanying drawings.

In general, the present invention is to provide a method for transmission of H.248 message over MTP3B. With appropriate protocol association definition and high-performance data structure index, the adaptation relationship between MTP3B signaling points and H.248 links is established, and the adaptation function is implemented by use of the adaptation layer (M3H) function entity from MTP3B to H.248, so that multiple H.248 link messages in different distribution patterns are shared by multiple H.248 processing modules in MGC or MGW. In addition, in the reverse direction, multiple H.248 link messages are transmitted over ATM and physical layers via the corresponding MTP3B modules. With the protocol stack H.248/MTP3B/SAAL/ATM, the networking flexibility of devices is greatly improved, and the existing mature techniques and network resources are fully utilized, thereby the cost of networking is reduced.

In an embodiment of the present invention, the mapping from H.248 signaling protocol and processing modules to MTP3B transport protocol and modules is implemented by use of the adaptation layer (M3H) from MTP3B to H.248 protocol, so that the M3H can accomplish the translation and adaptation between MTP3B link information (NI, OPC, DPC) and H.248 protocol processing module identification (ModuleID) and link number (LinkNo), without any change in the implementation mechanism of the existing MTP3B protocol stack and H.248 protocol stack.

M3H performs adaptation and forwarding between the MTP3B modules and the H.248 modules in accordance with the H.248 link information configured by the user. The MTP3B modules are connected to the devices at the opposite end via ATM interface. In an embodiment of the present invention, the configuration information of H.248 link mainly includes the following:

LinkNo: link number of H.248 link, which identifies the H.248 link configured by the user;

H.248 ModuleID: H.248 processing module identification, which identifies the module that processes the H.248 messages, and identifies uniquely, together with LinkNo, an H.248 link; in other words, multiple H.248 links with an identical LinkNo in the same H.248 processing module is forbidden, while two or more links with an identical LinkNo in different H.248 processing modules are permitted;

NI: Network Identification, which identifies the network type of the device, the value can be "International", "International Standby", "Domestic", or "Domestic Standby", etc.; the sending device and the receiving device should be of the same network type;

OPC: MTP3B original point code, which indicates the code of the signaling point at sending end;

DPC: MTP3B destination point code, which indicates the code of the signaling point at receiving end;

DistributeMode: distribution mode, which can be primary/standby mode or load sharing mode; links with identical configuration (NI, OPC, DPC) should be configured with the same DistributeMode; DistributeMode decides whether H.248 messages are to be shared by multiple H.248 links; if DistributeMode is the primary/standby mode, H.248 messages are only transmitted in one H.248 link, and other H.248 links are used as standby links; if DistributeMode is the load sharing mode, H.248 messages can be shared by all available H.248 links.

Because H.248 links are borne over MTP3B, the configuration information in the M3H adaptation layer includes not only the configuration information (e.g., LinkNo, H.248 ModuleID) of each H.248 link and the relevant information of corresponding MTP3B signaling points (e.g., NI, OPC, DPC) but also other bearing-related information (e.g., DistributeMode, which is the load sharing mode when multiple H.248 links are configured with identical parameters including NI, OPC, and DPC). Since those H.248 links have different H.248 ModuleID parameters, the load sharing here actually refers to the sharing of tasks among multiple H.248 processing modules in a single device, rather than the load sharing among MTP3B links.

Message transmission from H.248 to MTP3B and message receipt from MTP3B to H.248 can be implemented through the M3H adaptation layer configured with H.248 links. M3H establishes the mapping mechanism from H.248 to MTP3B and from MTP3B to H.248 in accordance with the configuration information, so as to implement the data translation and distribution during H.248 message transmission and receipt.

The mapping between MTP3B modules and H.248 processing modules can be established via the H.248 links configured by the user. With the internal communication mechanism of device, M3H can choose an H.248 link, and forward the H.248 message received by MTP3B from a device at the opposite end to the H.248 processing module specified by that link, or forward to MTP3B the H.248 message. The H.248 message is sent by the H.248 module towards a device at opposite end. MTP3B then forwards the message to the device at opposite end in accordance with the NI, OPC, and DPC.

Figure 2:
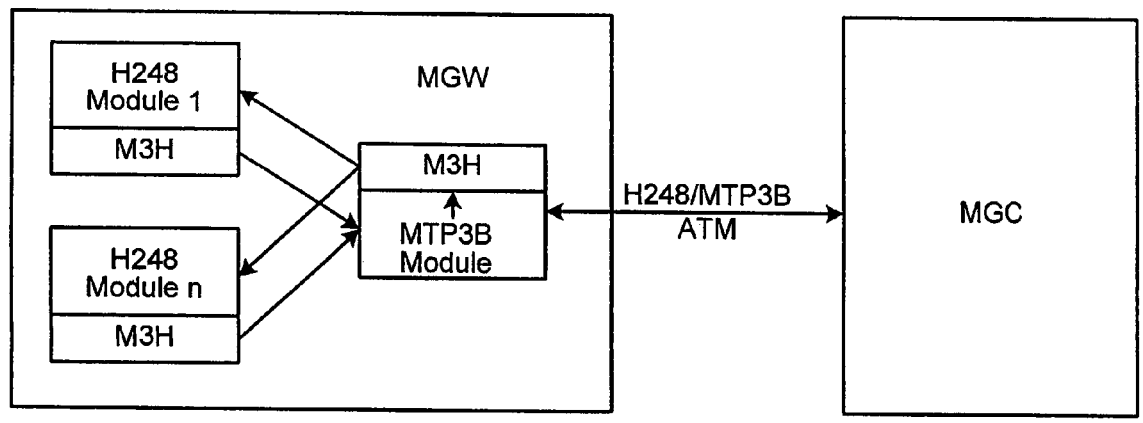
FIG. 2 is a schematic diagram of the logic relationship between H.248 module, MTP3B module, and M3H adaptation layer in the device according to an embodiment of the present invention.

FIG. 2 shows the logic relationship between the M3H adaptation layer and H.248 processing modules and the MTP3B module in device according to an embodiment of the present invention. In FIG. 2, the data flow paths and connection relationship between multiple H.248 processing modules, an MTP3B module and the M3H adaptation layer during H.248 message transmission between MGW and MGC are illustrated. H.248 messages to be sent from MGW are processed by the H.248 processing modules and then mapped via the M3H adaptation layer into the MTP3B link, and then the messages are translated and transmitted to the opposite end of the MTP3B link and finally received by MGC. In the reverse direction, H.248 messages returned from MGC are received by MGW in the MTP3B link, and mapped via M3H adaptation layer to H.248 link, and finally transmitted to the corresponding H.248 processing modules in a specified distribution mode.

In order to accomplish the adaptation from H.248 protocol layer to MTP3B transport layer, the M3H adaptation layer requires certain data structure, function entities, and mapping processes to enable the mapping function. Since there are usually multiple H.248 processing modules in the device, multiple H.248 links corresponding to those H.248 processing modules are usually configured for the same MTP3B (NI, OPC, DPC). In the M3H adaptation layer, all H.248 links with identical MTP3B (NI, OPC, DPC) are grouped into one H.248 LinkSet. For H.248 messages to be transmitted between MTP3B OPC and DPC, an H.248 link is chosen first in accordance with the predefined distribution mode; then the messages are transmitted to the corresponding H.248 processing modules. Therefore, in an H.248 LinkSet, each H.248 link should be served by a different H.248 processing module, so as to enable the load sharing function.

In an embodiment of the present invention, links with identical NI, OPC and DPC are configured as different H.248 links corresponding to different H.248 processing modules, so as to share the load between multiple H.248 processing modules. In M3H adaptation layer, H.248 links with identical NI, OPC and DPC are grouped into a LinkSet, an H.248 link in the same LinkSet is accessed by use of a LinkIndex. Since all H.248 links in the same LinkSet correspond to different H.238 processing modules, the LinkIndex of an H.248 link in the LinkSet is calculated in accordance with the processing module identification ModuleID configured for that H.248 link. All the H.248 links configured for a same H.248 processing module have an identical LinkIndex in their corresponding LinkSets.

In a device, there may be multiple H.248 LinkSets in the M3H adaptation layer, because the user may configure multiple different NIs, OPCs, and DPCs. In the M3H adaptation layer, the logic relationship between the multiple H.248 LinkSets, multiple H.248 modules, and multiple H.248 links has to be made clear. In an embodiment of the present invention, the M3H adaptation layer employs a "Table of LinkSets" to store the information related to LinkSets, and employs a table of H.248 processing modules to store the information related to the H.248 processing modules configured in the device, and employs an H.248-MTP3B mapping table to store the mapping relationship between LinkNos and NIs, OPCs and DCPs configured in corresponding H.248 processing modules, i.e., the mapping relationship between the H.248 links and the MTP3B links.

Figure 3:
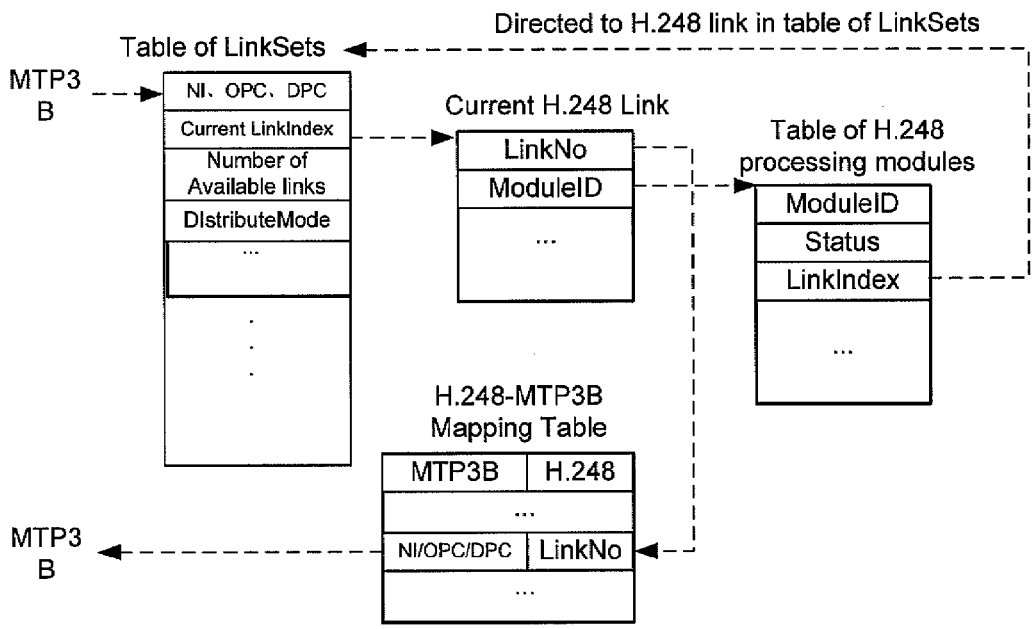
FIG. 3 is a schematic diagram of data structure and logic relationship in the M3H adaptation layer according to an embodiment of the present invention.

FIG. 3 shows the data structure and logic relationship in the M3H adaptation layer according to an embodiment of the present invention. The M3H adaptation layer includes a table of H.248 LinkSets, a table of H.248 processing modules, an H.248-MTP3B mapping table, etc. The formats and the logic relationship between these tables are shown.

In the table of H.248 LinkSets, each H.248 LinkSet contains its own MTP3B signaling point information (NI, OPC, DPC, etc.), and is also configured with other information related to the H.248 LinkSet, such as the current LinkIndex, the number of available links, the DistributeMode, and all H.248 links in the H.248 LinkSet. Here, the current LinkIndex refers to the index of the H.248 link currently chosen by the M3H adaptation layer for transmitting H.248 messages between the corresponding OPC and DPC. That is to say, in the current state, all the H.248 messages to be transmitted between the OPC and DPC are forwarded to the H.248 link referred to by the current LinkIndex, i.e., all the H.248 messages are processed by the corresponding H.248 processing module(s). For multiple H.248 links configured in the same H.248 LinkSet, the M3H adaptation layer chooses an H.248 link as the current link in accordance with the distribution mode in the H.248 LinkSet. As mentioned above, if the distribution mode is the primary/standby mode, the M3H adaptation layer will choose an available H.248 link (e.g., the oldest link) as the current link and take other links as standby links. That H.248 link will be used to transmit the H.248 messages all the time. If that H.248 link becomes unavailable, one of the standby links will be chosen as the current link, for example, the link with the smallest LinkIndex. Certainly, the current link can be chosen as required with respect to the primary/standby mode, and should not be limited to the embodiment. If the distribution mode is the load sharing mode, all available links configured by the user can be used to transmit the H.248 messages. The M3H adaptation layer will choose appropriate links to transmit the current H.248 message in accordance with the actual load condition of the links, so as to ensure load sharing among the links.

In the table of H.248 processing modules, each H.248 processing module is configured with information related to the H.248 processing modules in the device, such as the current status of the module. When an H.248 processing module becomes unavailable, the M3H adaptation layer will update the status of this module in the table, set all the H.248 links under this module as unavailable, and choose the current link in each LinkSet, so that the unavailable links may be replaced with the available links. In addition, the table is also configured with LinkIndexes of all H.248 links in the LinkSets for the module, so that the M3H adaptation layer can update the link statuses.

The H.248-MTP3B mapping table contains the mapping relationship between the LinkNo of each H.248 link configured for the corresponding H.248 processing module and NI, OPC and DPC information, i.e., the mapping relationship with the LinkSets. The table establishes the connection relationship from H.248 to MTP3B, so that the H.248 processing module can refer to the corresponding NI, OPC, and DPC directly by the LinkNo in accordance with the table, and thereby sends the H.248 messages to the device at opposite end via the MTP3B link.

As can be seen, the table of H.248 LinkSets is adapted to determine the appropriate H.248 links and H.248 processing modules when the messages are received from MTP3B. The table of H.248 processing modules is adapted to maintain the information of H.248 links and establish the mapping relationship between the H.248 processing modules and the corresponding H.248 links. The H.248-MTP3B mapping table is utilized by the H.248 processing modules to ascertain MTP3B NI, OPC, DPC in accordance with the chosen H.248 link(s), and is used by MTP3B to send the messages to the device at opposite end through ATM in accordance with the information.

Based on the data structure of the M3H adaptation layer as described above, the M3H adaptation layer stores information of H.248 links configured by the user in the above described tables and obtains the mapping relationship between H.248 processing ModuleID and MTP3B NI, OPC and DPC by use of this information of H.248 links, thereby accomplishing the adaptation between H.248 and MTP3B.

Figure 4:
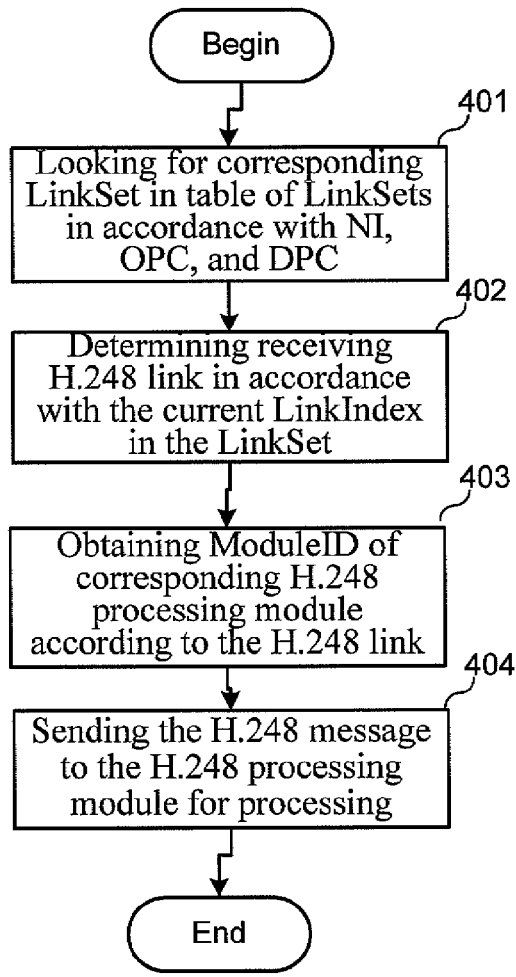
FIG. 4 is a flow diagram of receiving an H.248 signaling message according to an embodiment of the present invention.

The process flow of receiving/sending H.248 messages on M3H adaptation layer is described below. FIG. 4 shows the flow diagram of receiving an H.248 message from MTP3B and forwarding that message to an H.248 processing module according to an embodiment of the present invention. The processing procedure of the M3H adaptation layer on receiving an H.248 message from a device at opposite end includes the following.

In block 401, an H.248 message is received from MTP3B, and then the corresponding H.248 LinkSet is found in the table of H.248 LinkSet in accordance with NI, OPC and DPC information provided by MTP3B;

Next, in block 402, the current LinkIndex of the H.248 LinkSet is obtained from the table of H.248 LinkSets, so that the H.248 link to be selected to handle the H.248 message is ascertained;

Next, in block 403, the ModuleID of the corresponding H.248 processing module is obtained in accordance with the current H.248 link;

Finally, in block 404, the H.248 message is sent to the appropriate H.248 processing module through the internal message transmission mechanism in the device; so the H.248 message receiving process is completed.

Figure 5:
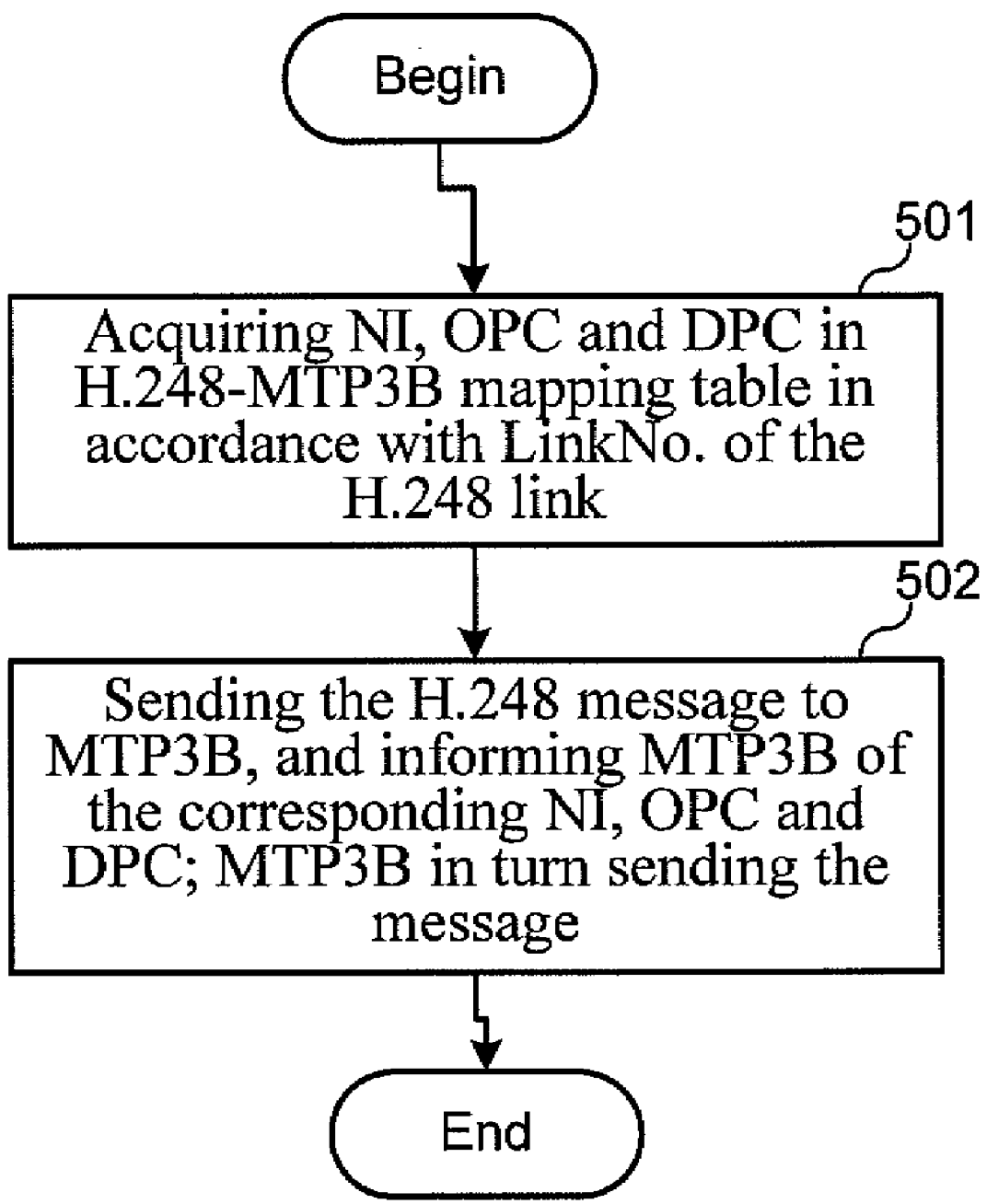
FIG. 5 is a flow diagram of sending an H.248 signaling message according to an embodiment of the present invention.

FIG. 5 shows the flow diagram of sending an H.248 message by an H.248 processing module via MTP3B according to an embodiment of the present invention. The process of the M3H adaptation layer sending an H.248 message to a device at the opposite end includes the following.

In block 501, the corresponding NI, OPC and DPC information is found in the H.248-MTP3B mapping table in accordance with the LinkNo of H.248 link designated by the H.248 processing module;

Next, in block 502, the H.248 message is sent to MTP3B through the internal message transmission mechanism in the device, and MTP3B is informed of the corresponding NI, OPC, and DPC information; then the H.248 message is sent via MTP3B to a device at the opposite end.

As can be seen, the H.248 links according to the embodiments of the present invention reflect the mapping relationship between MTP3B (NI, OPC, DPC) and the H.248 processing modules (i.e., ModuleIDs) in the device. With the information related to the H.248 links configured by the user and the internal data structure maintained by M3H, H.248 messages can be translated between MTP3B and H.248. As a result, a method of bearing H.248 protocol over MTP3B is implemented.

In an embodiment of the present invention, MTP3B is borne over ATM, while the physical layer network is E1/T1 network. Since the ATM transmission technique is a matured technique and the E1/T1 has rich physical network resources, this network bearing solution has many advantages, such as a flexible networking, improved utilization of existing resources, reduced networking cost, etc.

Those skill in the art shall understand that, with appropriate protocol association definition and high-performance data structure indexing, the mapping relationship between MTP3B, H.248 links, and H.248 processing modules can be established, so that the H.248 messages can be transmitted over MTP3B, thereby achieving an improved networking flexibility and reduced cost by use of ATM and E1/T1, without departing from the spirit and scope of the present invention.

While the present invention has been illustrated and described with reference to some preferred embodiments, the present invention is not limited to these. Those skilled in the art shall recognize that various variations and modifications can be made without departing from the spirit and scope of the present invention as defined by the accompanying claims.

What is claimed is:

1. A method for Gateway Control Protocol message transmission between a Media Gateway Controller and a Media Gateway, comprising:

when an MTP3B protocol layer receives a Gateway Control Protocol message, obtaining, by an adaptation layer M3H pre-configured between Message Transfer Part at level 3 Broadband (MTP3B) and Gateway Control Protocol layer, MTP3B information provided by the MTP3B protocol layer, determining a corresponding Gateway Control Protocol processing module in accordance with a pre-established mapping between the MTP3B protocol layer and a Gateway Control Protocol protocol layer, and forwarding the Gateway Control Protocol message to the determined Gateway Control Protocol processing module.

2. The method according to claim 1, further comprising:

configuring the adaptation layer M3H between Message Transfer Part at level 3 Broadband (MTP3B) and Gateway Control Protocol, and establishing the mapping between the MTP3B protocol layer and the Gateway Control Protocol protocol layer.

3. The method according to claim 2, wherein configuring the adaptation layer M3H and establishing the mapping comprises: establishing a mapping between MTP3B link information and Gateway Control Protocol links; establishing a mapping between Gateway Control Protocol link numbers and module identifications of Gateway Control Protocol processing modules.

4. The method according to claim 3, obtaining by the adaptation layer M3H MTP3B information provided by the MTP3B protocol layer when the MTP3B protocol layer receives a Gateway Control Protocol message, determining the corresponding Gateway Control Protocol processing module, and forwarding the Gateway Control Protocol message to the determined Gateway Control Protocol processing module comprising:

when receiving the Gateway Control Protocol message, obtaining, by the adaptation layer M3H, information of MTP3B signaling point provided by the MTP3B protocol layer, and finding a corresponding Gateway Control Protocol link for receiving;

obtaining a module identification of the corresponding Gateway Control Protocol processing module in accordance with the Gateway Control Protocol link;

sending, by the adaptation layer M3H, the Gateway Control Protocol message to the Gateway Control Protocol processing module by use of an internal message transmission mechanism.

5. The method according to claim 3, wherein configuring the adaptation layer M3H and establishing the mapping comprises:

establishing a Gateway Control Protocol-MTP3B mapping table to record mapping between Gateway Control Protocol links and MTP3B network identifications, MTP3B destination point codes and MTP3B original point codes;

establishing a table of Gateway Control Protocol LinkSets to record information related to all LinkSets, including sets of all Gateway Control Protocol links corresponding to the MTP3B network identifications, MTP3B destination point codes and MTP3B original point codes;

establishing a table of Gateway Control Protocol processing modules to record information related to all Gateway Control Protocol processing modules, including index information of the Gateway Control Protocol links corresponding to the Gateway Control Protocol processing modules in the Gateway Control Protocol LinkSets.

6. The method according to claim 5, wherein in the table of Gateway Control Protocol LinkSets, information related to a Gateway Control Protocol LinkSet comprises:

network identifications, MTP3B destination point codes, and MTP3B original point codes of MTP3B links corresponding to the Gateway Control Protocol LinkSet;

a current LinkIndex, which is adapted to refer to a Gateway Control Protocol link currently selected from the Gateway Control Protocol LinkSet to bear Gateway Control Protocol load, and is calculated by the adaptation layer M3H in accordance with a module identification of Gateway Control Protocol processing module corresponding to the Gateway Control Protocol link;

a total number of available links, which is the number of all Gateway Control Protocol links corresponding to the Gateway Control Protocol LinkSet;

obtaining, by the adaptation layer M3H, MTP3B information provided by the MTP3B protocol layer when the MTP3B protocol layer receives a Gateway Control Protocol message, determining the corresponding Gateway Control Protocol processing module, and forwarding the Gateway Control Protocol message to the determined Gateway Control Protocol processing module comprises:

when receiving the Gateway Control Protocol message, obtaining, by the adaptation layer M3H, information of MTP3B signaling point provided by the MTP3B protocol layer;

looking for a corresponding Gateway Control Protocol LinkSet in the table of Gateway Control Protocol LinkSets;

acquiring the current LinkIndex in the Gateway Control Protocol LinkSet, and determining a Gateway Control Protocol link for receiving in accordance with the current LinkIndex;

obtaining Module identication of a corresponding Gateway Control Protocol processing module in accordance with the Gateway Control Protocol link;

sending, by the adaptation layer M3H, the Gateway Control Protocol message to the Gateway Control Protocol processing module by use of an internal message transmission mechanism.

7. The method according to claim 6, wherein in the table of Gateway Control Protocol LinkSets, the information related to a Gateway Control Protocol LinkSet further comprises:

a Distribute Mode, which indicates a load sharing mode between all Gateway Control Protocol links in the Gateway Control Protocol LinkSet;

obtaining, by the adaptation layer M3H, information of MTP3B signaling point provided by the MTP3B protocol layer further comprises:

selecting, by the adaptation layer, a corresponding Gateway Control Protocol link to bear MTP3B link load in accordance with the DistributeMode.

8. The method according to claim 7, wherein in the table of Gateway Control Protocol processing modules, the information related to Gateway Control Protocol processing modules further comprises statuses of Gateway Control Protocol processing modules; and the method further comprises:

updating, by the adaptation layer M3H, the table of Gateway Control Protocol LinkSets in accordance with the statuses of the Gateway Control Protocol processing modules; if the status of a Gateway Control Protocol processing module becomes unavailable, setting, by the adaptation layer M3H, corresponding Gateway Control Protocol link as "unavailable" in accordance with LinkIndex of the Gateway Control Protocol link in the Gateway Control Protocol LinkSet, and selecting a new Gateway Control Protocol link to bear the MTP3B link load in accordance with the DistributeMode.

9. A method for Gateway Control Protocol message transmission between a Media Gateway Controller and a Media Gateway, comprising:

when a Gateway Control Protocol processing module sends a Gateway Control Protocol message, obtaining, by an adaptation layer M3H pre-configured between Message Transfer Part at level 3 Broadband (MTP3B) and Gateway Control Protocol layer, information of the Gateway Control Protocol message, acquiring corresponding MTP3B information in accordance with a pre-established mapping between an MTP3B protocol layer and a Gateway Control Protocol protocol layer, and forwarding the Gateway Control Protocol message to the MTP3B protocol layer, the MTP3B protocol layer sending out the Gateway Control Protocol message.

10. The method according to claim 9, further comprising:

configuring the adaptation layer M3H between Message Transfer Part at level 3 Broadband (MTP3B) and Gateway Control Protocol, and establishing the mapping between the MTP3B protocol layer and the Gateway Control Protocol protocol layer.

11. The method according to claim 10, wherein configuring the adaptation layer M3H and establishing the mapping comprises: establishing a mapping between MTP3B link information and Gateway Control Protocol links; establishing a mapping between Gateway Control Protocol link numbers and module identifications of Gateway Control Protocol processing modules.

12. The method according to claim 11, wherein obtaining by the adaptation layer M3H information of the Gateway Control Protocol message when the Gateway Control Protocol processing module sends a Gateway Control Protocol message, acquiring corresponding MTP3B information and forwarding the Gateway Control Protocol message to the MTP3B protocol layer comprises:

when the Gateway Control Protocol processing module sends the Gateway Control Protocol message, obtaining, by the adaptation layer M3H, information of a Gateway Control Protocol link corresponding to the Gateway Control Protocol message, and acquiring information of a corresponding MTP3B signaling point;

sending, by the adaptation layer M3H, the Gateway Control Protocol message to the MTP3B protocol layer by use of an internal message transmission mechanism, and notifying the MTP3B protocol layer of the information of the MTP3B signaling point; then forwarding, by the MTP3B protocol layer, the Gateway Control Protocol message to a device at opposite end.

13. The method according to claim 11, wherein configuring the adaptation layer M3H and establishing the mapping comprises:

establishing a Gateway Control Protocol-MTP3B mapping table to record mapping between Gateway Control Protocol links and MTP3B network identifications, MTP3B destination point codes and MTP3B original point codes;

establishing a table of Gateway Control Protocol LinkSets to record information related to all LinkSets, including sets of all Gateway Control Protocol links corresponding to the MTP3B network identifications, MTP3B destination point codes and MTP3B original point codes;

establishing a table of Gateway Control Protocol processing modules to record information related to all Gateway Control Protocol processing modules, including index information of the Gateway Control Protocol links corresponding to the Gateway Control Protocol processing modules in the Gateway Control Protocol LinkSets.

14. The method according to claim 13, wherein obtaining by the adaptation layer M3H information of the Gateway Control Protocol message when the Gateway Control Protocol processing module sends a Gateway Control Protocol message, acquiring corresponding MTP3B information and forwarding the Gateway Control Protocol message to the MTP3B protocol layer comprises:

when the Gateway Control Protocol processing module is to send the Gateway Control Protocol message, obtaining, by the adaptation layer M3H, information of MTP3B signaling point in the Gateway Control Protocol-MTP3B mapping table in accordance with link number of a Gateway Control Protocol link corresponding to the Gateway Control Protocol message;

sending, by the adaptation layer M3H, the Gateway Control Protocol message to the MTP3B protocol layer by use of an internal message transmission mechanism, and notifying the MTP3B protocol layer of the information of MTP3B signaling point; then forwarding, by the MTP3B protocol layer, the Gateway Control Protocol message to a device at opposite end.

15. An apparatus for Gateway Control Protocol message transmission between a Media Gateway Controller and a Media Gateway, comprising an adaptation layer M3H between a Message Transfer Part at level 3 Broadband (MTP3B) protocol layer and a Gateway Control Protocol layer, wherein the adaptation layer M3H has a mapping between the MTP3B protocol layer and the Gateway Control Protocol layer;

the adaptation layer M3H is adapted to, when the adaptation layer M3H receives a Gateway Control Protocol message, obtain MTP3B information provided by the MTP3B protocol layer, determine a corresponding Gateway Control Protocol processing module in accordance with the mapping, and forward the Gateway Control Protocol message to the determined Gateway Control Protocol processing module for processing; and when the Gateway Control Protocol processing module sends a Gateway Control Protocol message, the adaptation layer M3H obtains information of the Gateway Control Protocol message, acquires corresponding MTP3B information in accordance with the mapping, and forwards the Gateway Control Protocol message to the MTP3B protocol layer, then the MTP3B protocol layer sends the Gateway Control Protocol message.

16. The apparatus according to claim 15, wherein, the adaptation layer M3H is integrated in the Media Gateway.

* * * * *